A. H. HOADLEY.
TRACTOR SYSTEM FOR MOTOR VEHICLES.
APPLICATION FILED FEB. 14, 1913.
1,080,447.
Patented Dec. 2, 1913.
3 SHEETS—SHEET 3.
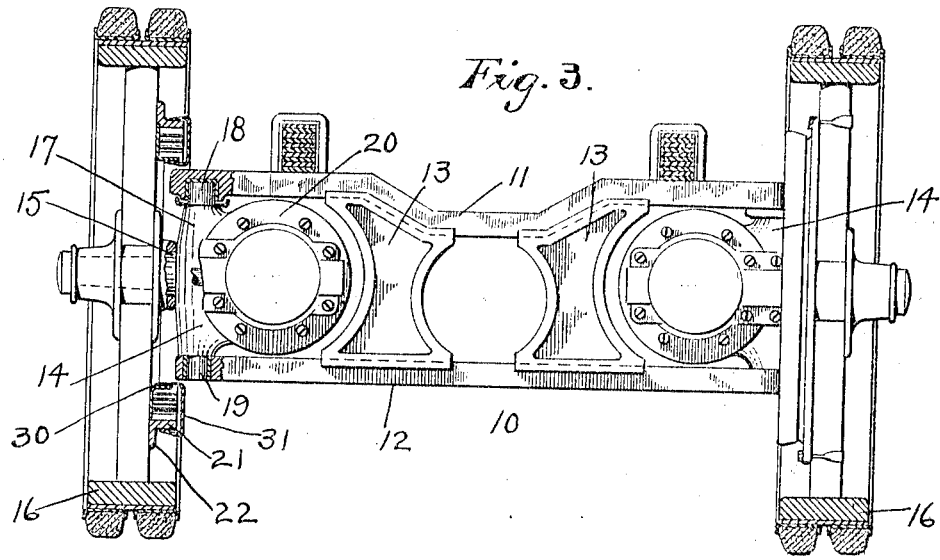
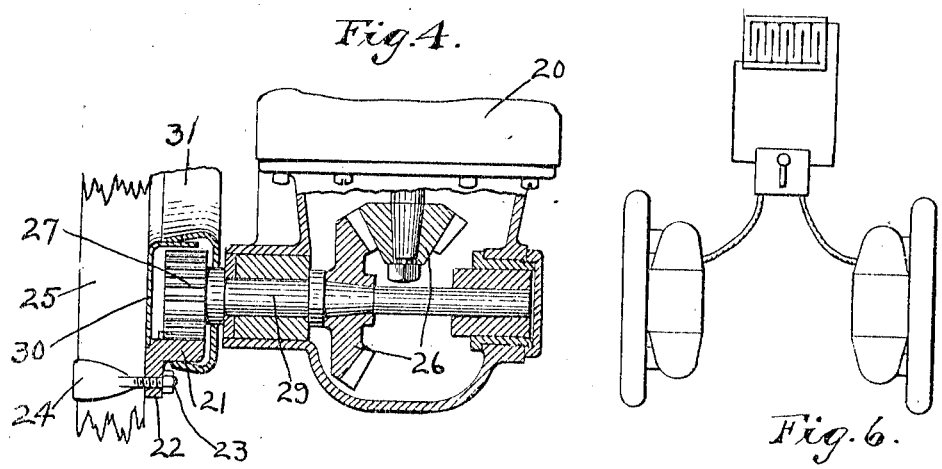
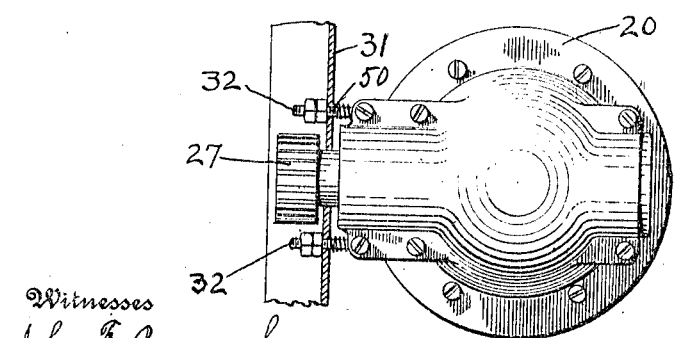
Witnesses
John F. Cavanagh
E. J. Ogden
Inventor
Alfred H Hoadley
By
Howard E Barlow
Attorney

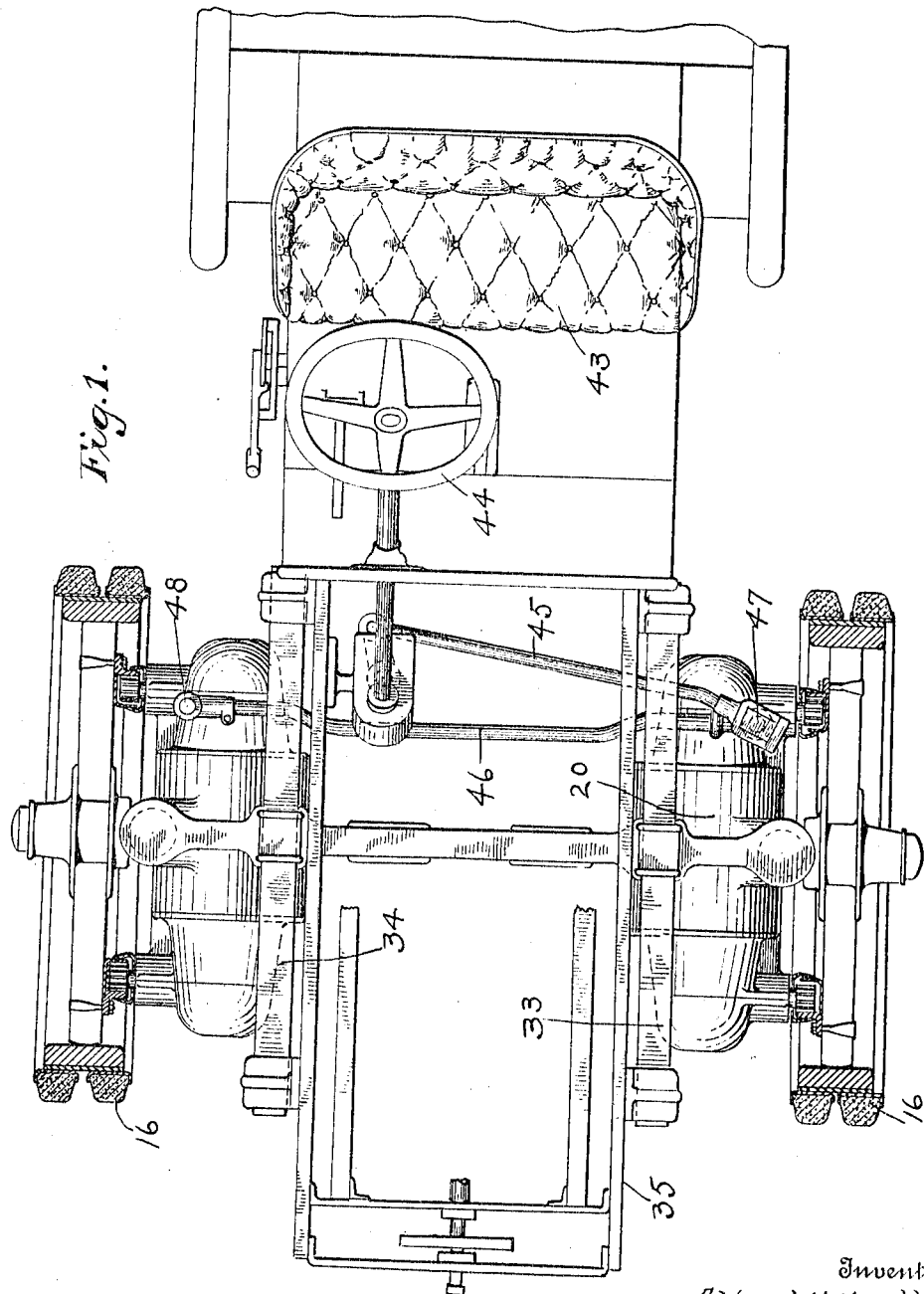

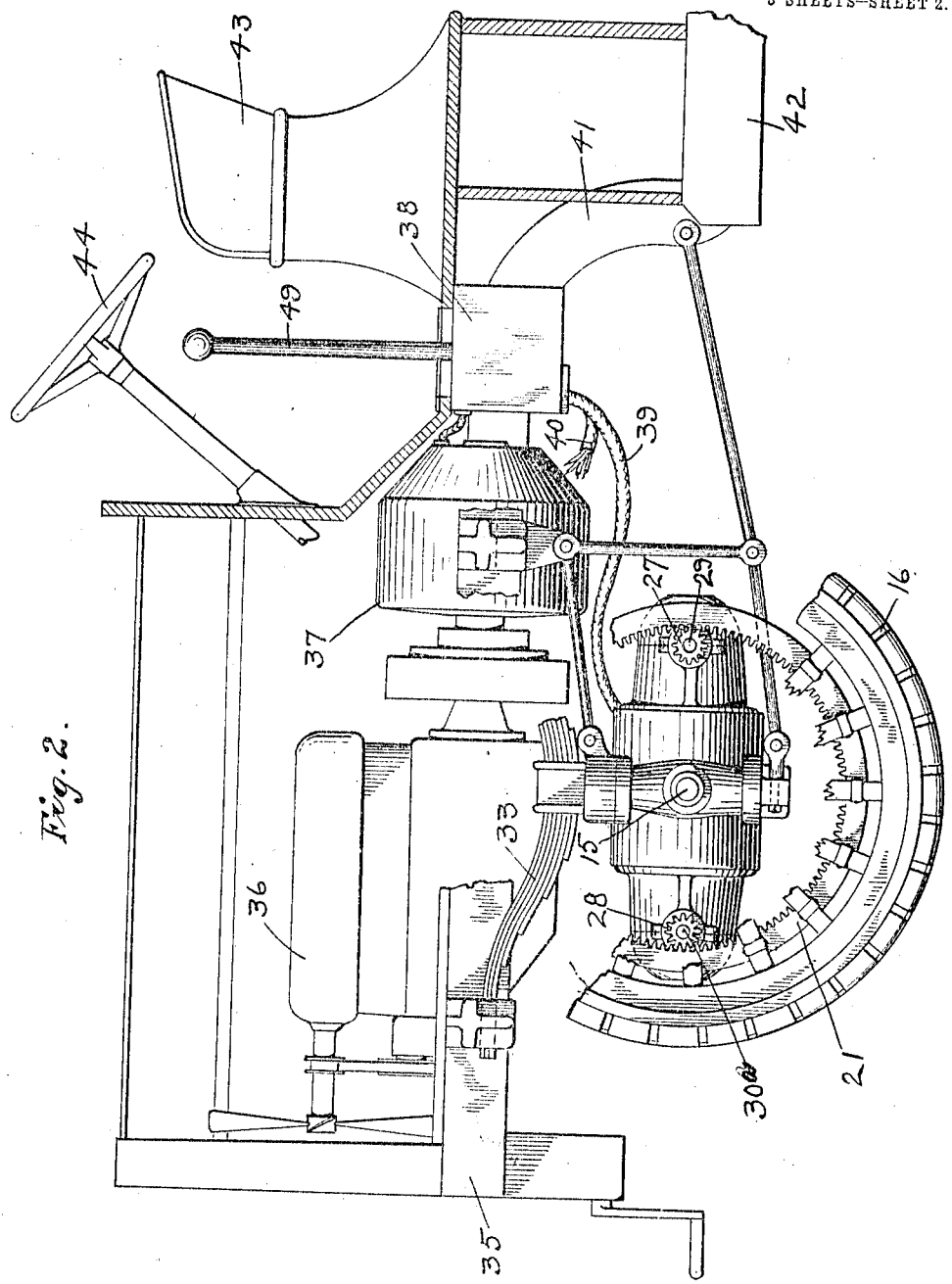

UNITED STATES PATENT OFFICE.

ALFRED H. HOADLEY, OF PROVIDENCE, RHODE ISLAND.

TRACTOR SYSTEM FOR MOTOR-VEHICLES.

1,080,447.   Specification of Letters Patent.   Patented Dec. 2, 1913.

Application filed February 14, 1913. Serial No. 748,302.

*To all whom it may concern:*

Be it known that I, ALFRED H. HOADLEY, a citizen of the United States, and resident of the city of Providence, in the county of Providence and State of Rhode Island, have invented certain new and useful Improvements in Tractor Systems for Motor-Vehicles, of which the following is a specification.

This invention relates to driving mechanism for motor vehicles, and has for its object to provide simple, practical and effective means for grouping and carrying all of the driving mechanism upon the forward axle, whereby the forward portion of the vehicle may be entirely independent of the rear portions thereof and detachably connected thereto if desired.

A further object is to produce improved results in pivotally mounting the forward traction wheels upon opposite ends of a relatively stationary axle whereby each wheel is driven direct by an independent electric motor mounted adjacent thereto, which system effectually eliminates the usual transmission and differential gearing and the consequent loss of power incident thereto.

A further object is to carry an electric generator for producing the current for driving these wheel actuating motors and also to provide an internal combustion engine for driving the generator, or in some cases a storage battery may be employed as a means for driving the wheel actuating motors direct if desired.

A still further object of the invention is to pivotally mount a steering knuckle on either end of the front axle of the vehicle and to mount a traction wheel on one side and an electric motor on the opposite side of the pivoting axis of each knuckle whereby the two will swing in unison in steering and to provide a pinion at each end of the motor to mesh with and drive the gear on the adjacent traction wheel, and a still further object of the invention is to provide improved means for protecting the driving gears from the action of foreign matter.

I am aware that steering wheels driven by electric motors suspended upon the pivoted steering members and swinging in unison therewith, have been revealed and used heretofore. My invention therefore does not consist of this combination of elements, broadly, but of this combination together with other elements, so combined and arranged as to produce improved results of vital importance in practice of the art.

With these and other objects in view, the invention consists of certain novel features of construction, as will be more fully described and particularly pointed out in the appended claims.

Of the accompanying drawings: Figure 1— is a plan view showing the arrangement of the electric driving motors each mounted adjacent its traction wheel to swing with it. Fig. 2— is a side elevation, partly in section, showing the general arrangement of the power plant and driving mechanism. Fig. 3— is a front elevation of the front axle partly in section, showing the relative position of the electric motors and the traction wheels they drive. Fig. 4— is an enlarged plan view showing one end of a motor with the casing partly broken away also showing the connection of its pinion to the internal gear on the traction wheel and the dust tight gear casing in section. Fig. 5— is an end view of the motor showing one portion of the dust tight gear casing as supported from the motor casing. Fig. 6— is a diagrammatic view illustrating a storage battery as providing the necessary power with which to drive the motors.

Referring to the drawings 10 designates the forward axle of my improved motor vehicle which may be constructed in any suitable form but the same is shown as having an upper cross bar 11 and a lower cross bar 12, the two being supported at a given distance from each other by means of the spacing members 13 to which they are bolted thereby securely and rigidly connecting them together. In either end of this relatively fixed axle is mounted a steering knuckle 14 each of which is provided with a laterally extending stub axle 15 on which the wheel 16 turns. The knuckle is also provided with a vertical portion 17 having a short trunnion 18 journaled in the upper bar of the axle and also a similar trunnion 19 journaled in the lower axle bar. This knuckle member is arranged to also be connected either by casting, bolting or otherwise to the casing 20 of the electric motor, thus the wheel, stub axle, knuckle member and motor form a single operating unit which will swing together as one on the pivoting axis of the knuckle in steering the vehicle. In order to operatively connect the motor to the traction wheel 16 an internal gear 21 is provided having an outwardly extending flange 22 to which the threaded ends 23 of straps 24 are connected which engage the spokes 25 of the wheel and securely bind the gear in position thereto.

A feature of this invention is that the motor is provided at each end with a pair of bevel gears 26, as illustrated at Fig. 4, which are employed to drive the pinions 27 and 28 through jack shafts 29 and 30ª set at right angles to the axis of the motor armature shaft, both of these pinions engage the teeth of the internal gear 21 and act upon the same to drive the wheel. As the result of the necessary speed ratios between the electric motor and the vehicle driving wheel, the driving pinions are necessarily of relatively small diameter and hence in some cases the small number of working teeth in a single pinion are insufficient to transmit the necessary power to drive the vehicle. Therefore by means of my double ended motor drive arrangement employing two pinions, double the number of teeth of a given pitch are in contact at the same time and hence the effective strength is doubled. Then again by applying the driving force at two distinct points on the wheel the strains on the structure are more nearly equalized providing a more flexible drive and contributing valuable qualities to the practical operation of the vehicle. When both of these motors are energized the power is transmitted directly to both wheels to drive each independently. In order to keep the teeth of the internal gear and those of the engaging pinions lubricated a dust proof gear casing has been provided consisting of two portions, one portion 30 being connected to and carried by the wheel while the other portion 31, which is formed in substantially a circular trough-shape, is supported from the motor casing by means of studs 32 and springs 50 in the manner best illustrated in Fig. 5. The portion 30 revolves with the wheel while the portion 31 is supported on the pinion shaft 29 and therefore remains stationary with reference to the portion 30. To avoid friction between the two portions they are made with a slight clearance and portion 31 is supported by the pinion shafts and the studs 32 in a non-contacting relation to portion 30. The interior of the gear casing thus formed is filled with some semi-solid lubricant which seals the joint between the parts against entrance of grit or other foreign matter from the road, and the gearing is thus effectively protected from undue wear. The springs 50 which are provided on the studs 32 permit the portion 31 of the casing to have some independent lateral motion which is transmitted to it by the vibration of the adjacent traction wheel. A duplicate set of the above described mechanism is provided for each wheel. Mounted on this forward axle are the springs 33 and 34 which support the framework 35. This frame is illustrated as carrying an internal combustion engine 36 arranged to drive an electric generator 37 for supplying the current necessary for running the electric motors above described. The current from this generator is passed through a controller 38 before it is permitted to pass through the cables 39 and 40 to the two motors.

The arrangement and operation of my improved apparatus may be more fully described as follows: The framework 35 is shown as extending back and then turned downward as at 41 to connect to the body of the vehicle 42 but any style or arrangement of frame may be employed. It may be so constructed as to be independently built and detachably connected to any vehicle body if desired. In some cases it may be connected to and employed in drawing fire apparatus or it may be employed for any service it is adapted to perform. The present arrangement illustrates a seat 43 for the operator and a steering wheel 44 by which he may swing the forward driven wheels 16—16 on their steering knuckles to steer the vehicle, through the medium of link 45 and tie rod 46 which are pivotally connected at 47 and 48 to the motor casing, see Fig. 1. The amount of current passing from the generator to the motors may be nicely controlled by a movement of the controller bar 49 whereby the torque of the motors may be varied to accommodate the load and the speed required.

I do not wish to be restricted to the use of an internal combustion engine for operating a generator to produce the current necessary for driving these motors, as a storage battery or any other means for supplying this current to the motors may be employed and will fall within the spirit and scope of my invention.

I claim:

1. A tractor system for motor vehicle comprising a relatively stationary axle, a traction wheel pivotally journaled at each end of said axle, an electric motor poratively connected and adapted to swing with each of said wheels, each motor having its axis set at substantially a right angle to that of its wheel axle and offset to one side of the central plane of rotation of its wheel, and means carried by the vehicle for supplying operating energy to said motors.

2. In a motor vehicle, a relatively stationary axle, a steering knuckle pivotally mounted at each end of said axle, a motor and a traction wheel both mounted on each knuckle, the axis of said motor being substantially at a right angle to that of the wheel axle and offset to one side of the central plane of rotation of its wheel, means for operatively connecting each motor to its wheel, and means carried by the vehicle for supplying energy to each motor to rotate its wheel and propel the vehicle.

3. In a motor vehicle, a relatively stationary axle, a steering knuckle pivotally mounted at each end of said axle, a motor and a traction wheel both mounted on each knuckle and on opposite sides of the pivoting point, the axis of said motor being substantially at a right angle to that of the wheel axle and offset to one side of the central plane of rotation of its wheel, means for operatively connecting each motor to its wheel, and means carried by the vehicle for supplying energy to each motor to rotate its wheel and propel the vehicle.

4. In a motor vehicle, an axle, a steering knuckle pivotally mounted at each end of said axle, a motor and a traction wheel both mounted on each knuckle, the axis of said motor being set to one side of the central plane of rotation of its wheel, a gear connected to the wheel, a pinion driven from each end of said motor and engaging its gear, and means carried by the vehicle for supplying energy to each motor to rotate its wheel and propel the vehicle.

5. In a motor vehicle, an axle, a steering knuckle pivotally mounted at each end of said axle, an electric motor and a traction wheel mounted on each knuckle, the axis of said motor being substantially at a right angle to that of the wheel axle and offset to one side of the central plane of rotation of its wheel, a gear connected to the wheel, a pinion driven from each end of said motor and engaging its gear, a dust proof casing inclosing said gears and means for supplying energy to said motors to rotate its wheel and propel the vehicle.

6. In a motor vehicle, a relatively stationary axle, a steering knuckle pivotally mounted at each end of said axle, an electric motor and a traction wheel mounted on each knuckle, an internal gear attached to the spokes of the wheel, a pinion driven from each end of said motor and engaging said gear, a dust proof casing inclosing said gears one portion being carried by the wheel and the other by the motor casing, an electric generator carried by the vehicle for supplying energy to said motors to rotate its wheel and propel the vehicle, and means for driving said generator.

7. A motor vehicle comprising a relatively stationary axle, traction wheels pivotally journaled upon opposite ends of said axle, an electric motor mounted adjacent each wheel, a gear connected to the wheel, a pinion driven from each end of said motor and engaging said gear, the axes of the pinions being at right angles to the axis of the motor armature shaft and parallel with the axis of the wheel gear, and means carried by the vehicle for supplying energy to said motor to rotate this wheel and propel the vehicle.

8. A tractor system for motor vehicles comprising a main axle, a steering knuckle, a traction wheel and an electric motor mounted at either end of said axle upon each of said knuckles, the axis of each motor being offset toward the inner side of the wheel from the central plane of rotation thereof, two distinct sets of gearing one at either end of each motor connecting said motors to their respective wheels, and means for supplying operating energy to said motors.

9. A tractor system for motor vehicles comprising a main axle, a steering knuckle pivotally mounted on said axle, a traction wheel and an electric motor carried by and mounted upon opposite sides of the pivoting point of each of said knuckles, two distinct sets of gearing one at either end of each motor connecting said motors to their respective wheels, and means for supplying operating energy to said motors.

10. A tractor system for motor vehicles comprising a main axle, a steering knuckle mounted at either end of said axle, a traction wheel and an electric motor mounted upon each of said knuckles, a gear fixed to each wheel, a pinion driven from each end of each motor and engaging its wheel gear, the axis of said pinions being set at right angles to that of its motor, and means for supplying operating energy to said motors.

11. A tractor system for vehicles comprising a main axle, steering knuckles pivotally mounted at opposite ends of said axle, a traction wheel and an electric motor carried by and located on opposite sides of the pivoting point of said knuckles, each wheel having a gear fixed thereto and each motor having a pinion driven from each end thereof and having its axis set at a right angle to that of its motor and engaging its gear, a dust proof casing inclosing said gears, one portion of said casing being carried by the wheel and another portion being yieldingly supported on the motor casing, and means for supplying operating energy to said motors to drive the vehicle.

12. A tractor system for vehicles comprising a main axle, steering knuckles pivotally mounted at opposite ends of said axle, a traction wheel and an electric motor carried by and located on opposite sides of the pivoting point of said knuckles, each wheel having a gear fixed thereto and each motor having a pinion driven from each end thereof and having its axis set at substantially a right angle to that of its motor and engaging its gear, and means for supplying operating energy to said motors to drive the vehicle.

13. A tractor system for vehicles comprising a main axle, steering knuckles pivotally mounted at opposite ends of said axle, a traction wheel and an electric motor carried by and located on opposite sides of the pivoting point of said knuckles, each wheel having an internal gear attached to its spokes and each motor having a pinion driven from each end thereof and having its axis set at substantially a right angle to that of its motor and engaging its gear, and means for supplying operating energy to said motors to drive the vehicle.

In testimony whereof I affix my signature in presence of two witnesses.

ALFRED H. HOADLEY.

Witnesses:
  GEORGE P. MACREADY,
  CLIFFORD E. HUNT